United States Patent

[11] 3,625,489

| [72] | Inventor | Arthur James Weaver<br>Omaha, Nebr. |
|---|---|---|
| [21] | Appl. No. | 62,074 |
| [22] | Filed | Aug. 7, 1970 |
| [45] | Patented | Dec. 7, 1971 |
| [73] | Assignee | Infra-Radiant Corporation<br>Peoria, Ill. |

[54] ROAD REPAIR MACHINE
7 Claims, 5 Drawing Figs.

[52] U.S. Cl................................................. 259/157,
94/39
[51] Int. Cl...................................................... B28c 1/22
[50] Field of Search............................................. 259/155,
156, 157, 158, 159 R, 145, 146, 148, 153; 94/39,
42

[56] References Cited
UNITED STATES PATENTS

| 2,772,083 | 11/1956 | Parker | 259/158 |
| 2,867,421 | 1/1959 | Camm | 259/158 |
| 2,967,696 | 1/1961 | Mauldin | 259/158 |
| 3,066,582 | 12/1962 | Cutler | 94/39 |

*Primary Examiner*—Robert W. Jenkins
*Attorney*—Hiram A. Sturges

ABSTRACT: A road repair machine comprising a self-propelled wheeled vehicle having a heating hood assembly mounted at one end thereof, means for adjustably mounting the heating hood assembly so that it can be positioned at times in a lower operational position and at other times in an upper storage position, the vehicle having a hot-mix hopper, fuel tanks and a hoist mounted thereon.

PATENTED DEC 7 1971
3,625,489
SHEET 1 OF 2
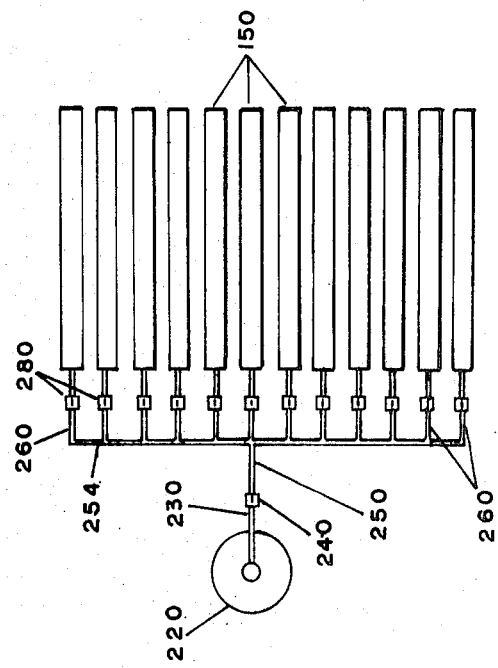
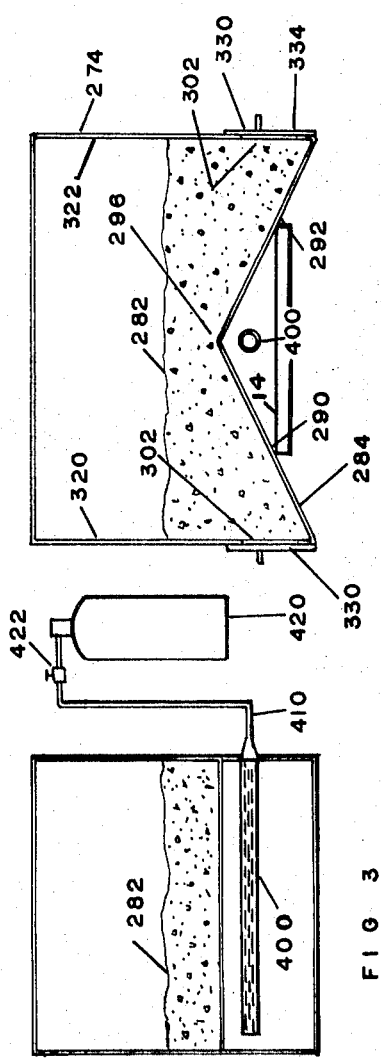

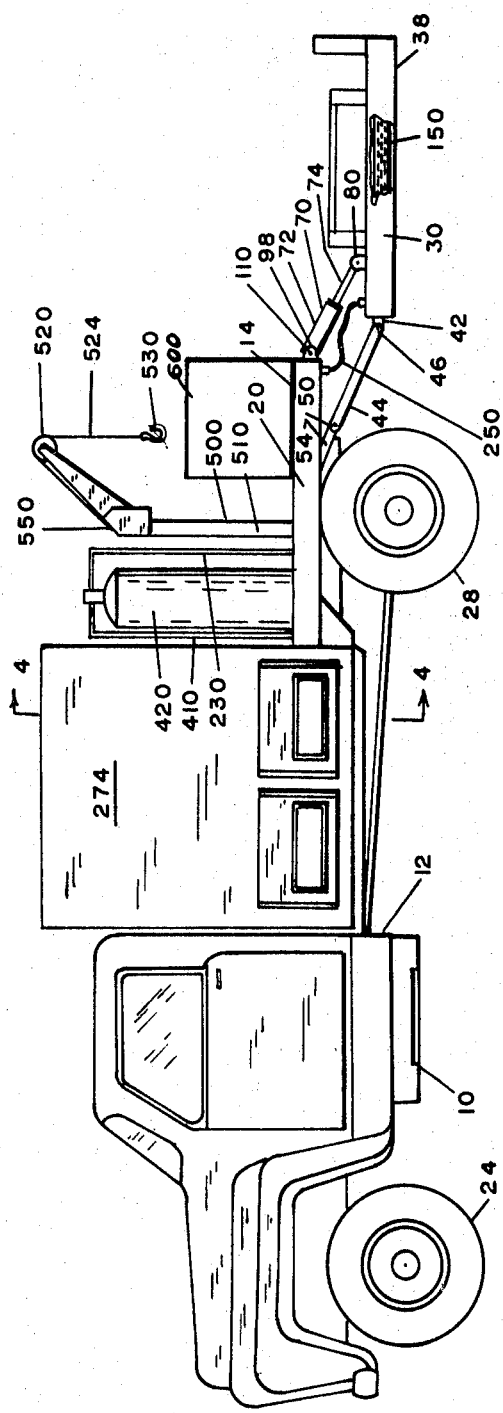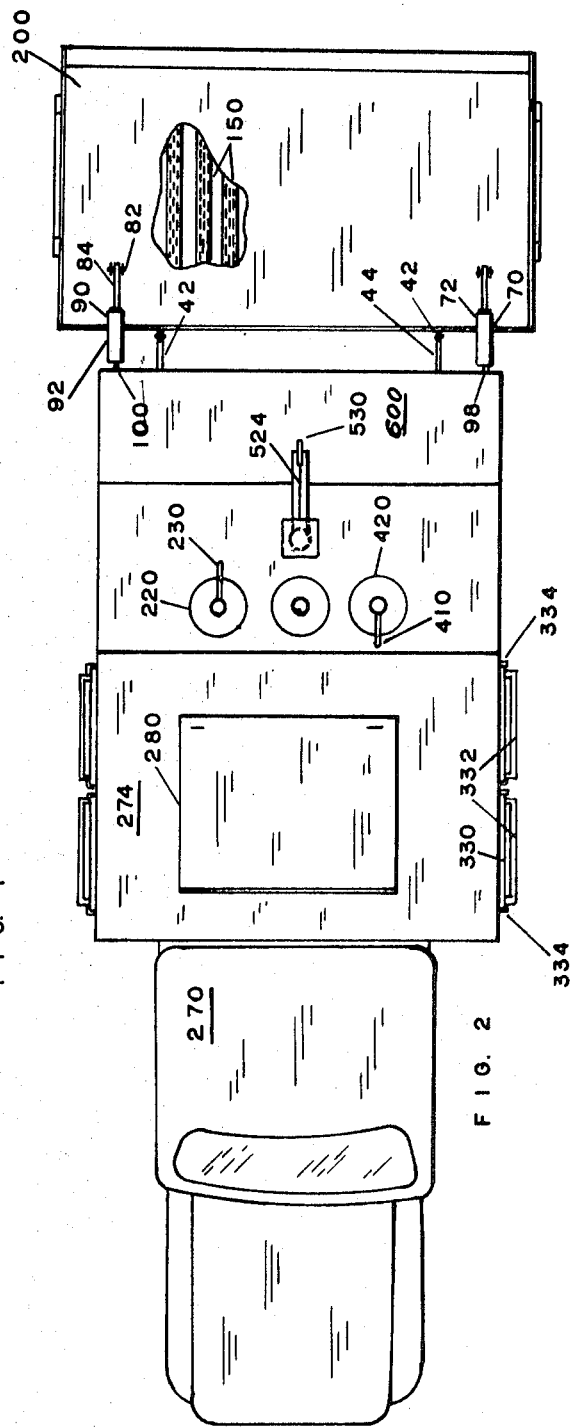

ROAD REPAIR MACHINE

FIELD OF THE INVENTION

This invention is in the field of machines for highway repair involving asphalt or other highway repair materials which tend to flow and bond with each other when heated.

DESCRIPTION OF THE PRIOR ART

For repair of chuck holes in asphalt pavement, the best equipment available in the prior art has been the combination of a trailer with a heating hood mounted on it for heating the asphalt street surface sufficiently so that it can be raked for making the surface rough and ready to accept a hot mix. However, with the heating hood trailer of the prior art it has been necessary to have a separate hot-mix hopper truck and a separate truck to carry away debris.

SUMMARY OF THE INVENTION

A road repair machine comprising a self-propelled wheeled vehicle having a heating hood assembly mounted at one end thereof, means for adjustably mounting the heating hood assembly so that it can be positioned at times in a lower operational position and at other times in an upper storage position, the vehicle having a hot-mix hopper, fuel tanks and a hoist mounted thereon.

The road repair machine having the bottom wall means of its hot-mix hopper inclining downward and outwardly at at least one of the sides of the vehicle with the outermost parts of the bottom wall means projecting beyond the side of the closest adjacent parts of the vehicle and extending below the closest adjacent parts of the vehicle, and the hot-mix hopper having an exit opening means disposed at substantially the same height as the outermost portion of the bottom wall means so that a workman can insert a shovel into the opening means while standing on the surface that is supporting the wheels of the road repair machine.

The road repair machine described further having a debris container thereon.

BRIEF DESCRIPTION OF THE DRAWING

FIG. 1 is a side elevation of the road repair machine of this invention with parts thereof broken away for showing interior construction.

FIG. 2 is a top plan view of the road repair machine of FIG. 1 with parts thereof broken away for showing interior construction.

FIG. 3 is a longitudinal section taken vertically through the center of the vehicle of FIG. 1 at the hot-mix tank, and showing hot mix therein.

FIG. 4 is a sectional view taken along the line 4—4 of FIG. 1 and showing the upper part of the bed of the truck thereunder.

FIG. 5 is a diagram showing the arrangement of conduits leading from a propane tank to the heating tubes of the heating hood.

DESCRIPTION OF THE PREFERRED EMBODIMENT

The asphalt repair machine of this invention is generally indicated at 10 in FIG. 1 and is a truck 12 having a bed 14 and having a frame 20, forward wheels 24, and rearward wheels 28.

On the rearward end of the frame behind the rear wheels an infrared heating hood assembly is shown at 30 and the heating hood assembly is of the type manufactured in accordance with the U.S. Pat. No. 3,311,104.

The hood assembly has a frame 38 having spaced ears 42 connected to its forward side, suspension linkages 44 pivotally connected to right and left ears 42 by bolts 46 which are aligned on a horizontal axis.

The opposite ends of the linkages 44 are disposed extending forwardly and upwardly to a forward pivot axis extending through bolts 50 connecting each linkage 44 at its forward end to a suspension plate 54 of which there is one on the left and one on the right of the frame 20 above and to the rearward of the rear wheels 28.

An hydraulic cylinder assembly 70 having a cylinder 72 and a piston 74 is provided, the piston 74 being connected by suitable means 80 to frame 38 of the hood assembly for the pivoting of the piston rod 74 about a horizontal axis extending from right to left and extending also through a pivot connection means 82 connecting the piston rod 84 of a second cylinder assembly 90 to the frame 38.

The cylinders 72 and 92 of the cylinder assemblies 70 and 90 extend forwardly and upwardly while the hood assembly 30 is in a position of operation.

The forward end of each cylinder 72 and 92 is pivotally connected by suitable means generally indicated at 98 and 100 to the rearward end of the frame 20 for the pivoting of the cylinders 72 and 92 about a forward pivot axis 110, best seen in FIG. 1. The forward pivot axis 110 extends from right to left in parallelism with the pivot axis of the pivot connections at 46, 50, and 80, each axis being horizontal.

Inside the hood assembly 30 there are located a plurality of forward to rearwardly extending perforated pipes 150 in which butane fuel is burning creating a heat which is reflected downward by a top cover 200 which can be of any suitable construction, whereby heat from the underside of the assembly 30 is sufficient to cause an existing asphalt road area to become soft enough so that the hood assembly can be raised and the asphalt area raked for making the surface rough and ready to accept a hot asphalt mix carried by the repair machine as later described.

Butane fuel for the heating pipes or tubes 150 comes from butane storage tanks mounted on the bed 14, as best seen in FIGS. 1 and 2, a supply line from a butane tank 220 is shown at 230 and it passes through a valve 240 to a flexible conduit 250, which latter extends from the truck frame 20 20 down to the hood assembly 30, as best seen in FIG. 1.

The flexible conduit 250 connects to a header line 254 which is itself connected to multiple feeder lines 260 which are connected each to one of the tubes 150. Each feeder line 260 has a valve 280 in it.

At the forward end of the bed 14 immediately behind the cab 270 of the truck, a hot-mix hopper assembly 274 is mounted extending completely from the right to the left side of the bed 14 and having a door 280 in its upper side which can be opened for placing hot asphalt mix material into the upper side of the mix hopper assembly so that the hot-mix material which is shown at 282 rests upon the bottom wall 284 of the hopper, the bottom wall 284 having right and left portions 290 and 292, each of which lies in a plane at an obtuse inclination with respect to the other so that the bottom wall sections 290 and 292 join at a center ridge 296 which extends forwardly and rearwardly in the center of the hot-mix hopper 274 with the panels 290 and 292 extending outwardly and downwardly from the center ridge 296 to lower outer ends for guiding the hot-mix material 282 toward doorway openings 302 at the right and left sides and extending through the right and left sidewalls 320 and 322 of the hopper assembly 274.

The opening 302 are covered by suitable doors 330 that can be opened so that a workman can insert a shovel through the openings 302 for shoveling out the hot mix 282 to carry it to a place to be repaired.

The hot-mix hopper assembly 274 is heated by a heating tube 400 which extends forward to rearwardly under the center of its bottom wall 284 and is spaced therefrom somewhat, as seen in FIGS. 3 and 4. The tube 400 is connected by a supply line 410 to a butane tank 420 and a shutoff valve 422 is provided in the line 410.

In FIG. 1, a hoist assembly is generally indicated at 500 and is mounted on a vertical post 510 extending upwardly from and firmly attached to the bed 14. The hoist assembly 500 has a pulley 520 at its upper end, a cable 524 and hook 530, the cable 524 being adapted to be reeled in or paid out by a motorized winch 550 of any suitable type.

Referring to FIG. 4, it will be seen that the outermost parts of the bottom wall portions 290 and 292 and also the lowermost parts of the openings 302 are all seen to be disposed a substantial distance below the upper horizontal surface 14 of the bed of the truck. With this construction the openings 302 can be disposed much lower so that a workman can insert a shovel therein while he is standing upon the surface of the roadway supporting the wheels of the truck.

In operation, when the road machine of this invention is taken to a work cite, the area of a chuckhole can be heated with the heating hood until it is soft enough to be raked for accepting hot mix. Hot mix is quickly available from the mix hopper from which it can be easily shoveled.

A tamper or roller can be carried on the bed of the truck and hoisted to the ground and later replaced on the truck by means of the power hoist 500.

I claim:

1. A road repair machine comprising a wheeled vehicle, a heating hood assembly mounted at the rearward end of said vehicle, means for adjustably mounting said assembly on said vehicle in a manner such that said assembly can be placed at various heights above an approximately horizontal surface on which the wheels of said vehicle are resting, said vehicle having a hot-mix hopper thereon, said hopper having an entrance opening into which the material for a hot mix can be inserted, said hopper having exit opening means on at least one side of said vehicle and disposed at a convenient height so that a workman standing on said surface can insert a shovel into said exit opening means and withdraw hot-mix material, fuel tanks mounted on said vehicle, means interconnecting said fuel tanks and said heating hood assembly.

2. The combination of claim 1 in which said means for attaching said heating hood assembly to said vehicle comprises right and left linkage means disposed on the right and left sides of said vehicle respectively and extending forwardly from said heating hood assembly, pivotal connection means at the forward and rearward ends respectively of each of said linkage means, means connecting the pivotal connection means at the rearward ends of each linkage means to said heating hood assembly in a manner for the pivoting of the forward end of said heating hood assembly about a horizontal first axis extending from the right to the left of said vehicle, means connecting the respective pivotal connection means at the forward ends of said linkages to said vehicle in a manner for the pivoting of the forward ends of said linkage means about a second horizontal axis extending parallel to said first horizontal axis, at least one elongated hydraulic cylinder assembly means extending forwardly and rearwardly of said vehicle and having a rearward end disposed above said heating hood assembly, means pivotally connecting the rearward end of said hydraulic cylinder assembly to said heating hood assembly in a manner for rotation about a third axis parallel to said first axis, said hood assembly having heating elements, the lowermost parts of said heating elements being disposed approximately in a plane, means pivotally connecting the forward end of said hydraulic cylinder assembly means to said vehicle in a manner for the pivoting of the forward end of said hydraulic cylinder assembly means about a fourth axis parallel to said first axis, said fourth axis being so disposed that when said heating hood assembly is disposed in operational road-heating positions closer to said supporting surface then operation of said hydraulic cylinder assembly means will cause movements of said heating hood assembly which dispose the said plane of said lowermost parts in substantially a horizontal position.

3. The combination of claim 2 in which said axes are also in positions such that when said hydraulic cylinder means is shortened to a maximum, the rearward end of said hood assembly will be substantially higher than its forward end.

4. The combination of claim 1 in which a hoist is mounted on said truck.

5. The combination of claim 1 in which a debris container is mounted on said truck.

6. The machine of claim 1 in which said truck has a bed having a substantially horizontal upper surface, said hot-mix hopper having bottom wall means which inclines downwardly at one of the sides of said vehicle, outermost parts of said bottom wall means projecting beyond the adjacent side of said bed and projecting below the adjacent side of said bed, said hot-mix hopper exit opening means being disposed at substantially the same height as the outermost portion of said bottom wall means so that said opening is disposed lower than the upper side of said bed so that a workman can insert a shovel into it with ease.

7. The combination of claim 1 in which a door means is mounted on the outside of said hopper and covering said opening means, means for mounting said door means on said hopper in a manner for the vertical sliding of said door means upwardly on the outside of said hopper for access to and closing said opening means.

* * * * *